CONTROL APPARATUS FOR REMOTE DICTATION SYSTEMS
Filed April 28, 1955
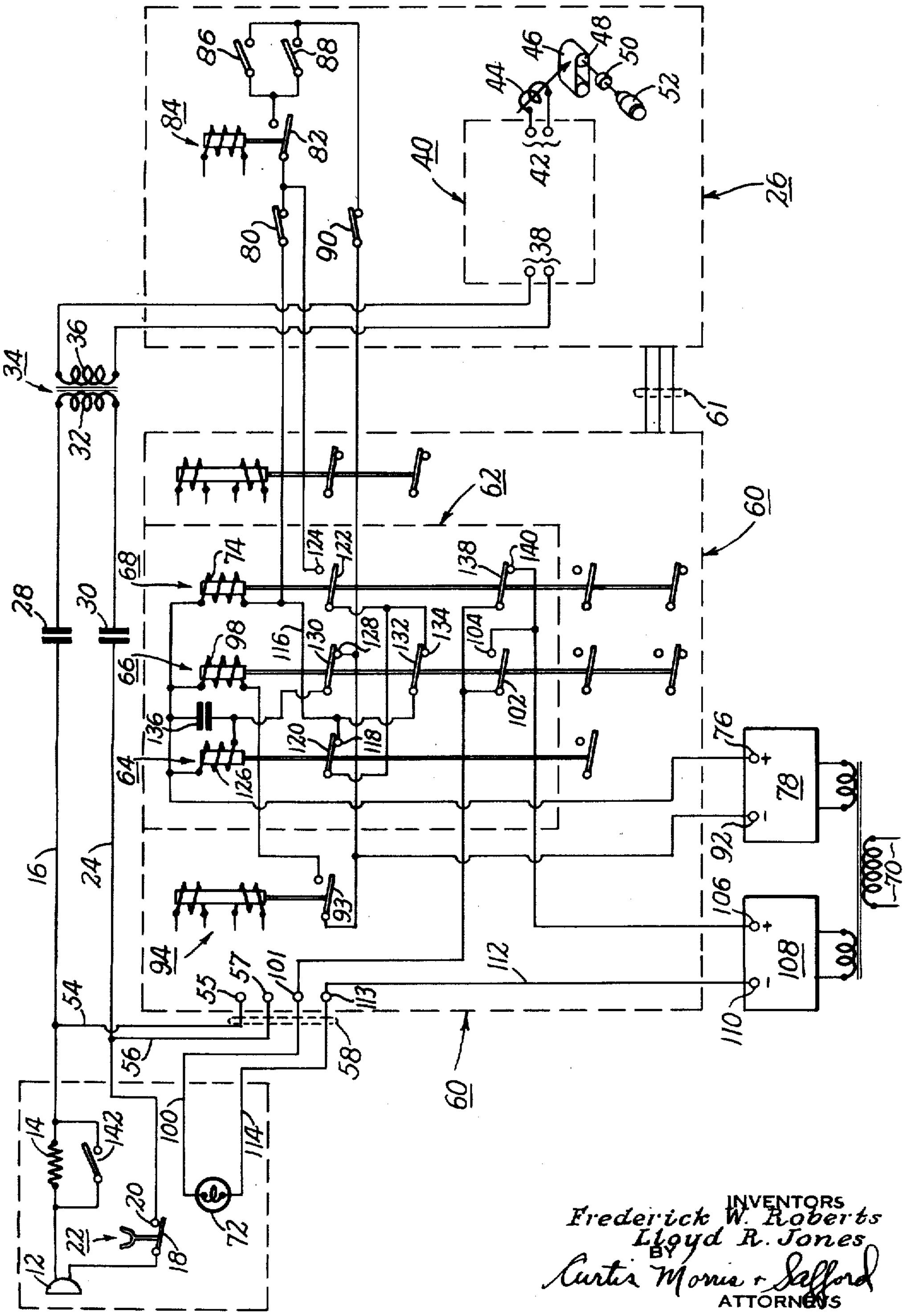
INVENTORS
Frederick W. Roberts
Lloyd R. Jones
BY
Curtis Morris & Safford
ATTORNEYS

United States Patent Office 2,791,639

Patented May 7, 1957

2,791,639

CONTROL APPARATUS FOR REMOTE DICTATION SYSTEMS

Frederick W. Roberts, Fairfield, and Lloyd R. Jones, Bridgeport, Conn., assignors to Dictaphone Corporation, Bridgeport, Conn.

Application April 28, 1955, Serial No. 504,439

4 Claims. (Cl. 179—100.1)

This invention relates to remote dictation systems wherein any one of a number of remotely-located dictator's stations is connectible to a central dictating machine. More particularly, this invention relates to improved arrangements for automatically providing suitable signals at an appropriate stage of dictating operations when there is insufficient unrecorded area on the record medium for a dictation period of normal length. These signals are used, for example, to notify the attendant at the central machine that the record should be changed, to signify to the remote dictator that he may not proceed until the record has been changed, and to automatically disable the dictating machine until the record has been changed.

Accordingly, the invention resides in the circuit arrangements shown in the accompanying drawing which represents schematically one embodiment of the invention. Apparatus constructed in accordance with this invention is particularly adapted to be employed with a remote dictation system of the type disclosed in the copending application of Lloyd R. Jones et al., Serial No. 457,165, filed on September 20, 1954.

Since the showing of such a system in its entirety would tend to interfere with a clear understanding of the present invention, the accompanying drawing includes specific disclosure of only those elements required to demonstrate the principles of the invention and its application to such a system. In this drawing, frequent use is made of "block diagram" showings to represent apparatus known heretofore as capable of performing certain functions accomplished by commercially available remote dictation systems. This drawing, furthermore, has been based upon the drawings forming a part of the above-mentioned Jones et al. application so that the details of such apparatus as is functionally indicated herein may, if desired, be determined by reference to that application.

Other aspects, objects and advantages of the invention will be in part pointed out in, and in part apparent from, the following description considered together with the accompanying drawing.

In the upper left hand corner of the drawing, there is shown a remote dictator's instrument represented by a block generally indicated at 10. This instrument may, for example, be of the type disclosed in the above-mentioned copending application, and normally will include a telephone handset having a transmitter and a receiver, noise suppression circuits, and associated control switches for operating the dictation system. The showing herein of the components making up this remote dictator's instrument is considerably abbreviated and includes only those circuit elements which appear to be necessary for a proper understanding of the present invention.

This instrument 10 includes a microphone unit 12, for example a resistance-type transducer such as normally is provided with a telephone handset. One terminal of this microphone 12 is connected through a resistor 14 to an interconnecting line 16, while the other terminal of the microphone is connected through the movable arm

18 and fixed contact 20 of an operating switch (e. g. the telephone cradle switch), generally indicated at 22, to a second interconnecting line 24. These two interconnecting lines 16 and 24 form a talking circuit for transmitting audible signals to a central dictating machine (see the right hand side of the drawing) generally indicated by a block 26.

For this purpose, lines 16 and 24 are connected through two D.-C. isolating capacitors 28 and 30 to the primary winding 32 of an audio transformer generally indicated at 34. The secondary winding 36 of this transformer is connected to the input circuit 38 of an amplifier shown in broken lines at 40 (forming a part of the central dictating machine and located within the block 26), the output circuit 42 of which is coupled to a transducing device 44 which, when suitably energized, causes a recording of the sound signals carried by the interconnecting lines 16 and 24 to be made on a record 46. This record 46 is held in position on a rotatable support 48, which may be any one of the usual types normally provided with commercial dictating machines. The support 48 is rotated, through a clutch mechanism 50, by a motor 52 which is energized by the usual 110 volt A.-C. power line through appropriate control circuitry (not shown).

Lines 16 and 24 also are connected, respectively, through two leads 54 and 56 forming part of a cable 58 to two input terminals 55 and 57 of a control unit generally indicated by a block 60. Shown as part of this control unit within an interior broken-line block generally indicated at 62, are three relays generally indicated at 64, 66 and 68, and referred to herein as the "tone," "hold" and "limit" relays, respectively, to provide a terminology correspondence between the showing herein and the disclosure of the above-mentioned copending application. The remainder of the control unit 60 comprises, for example, additional electrical relays and associated circuitry such as disclosed in that application (but not shown herein in order to simplify the drawing), and which provide certain remote dictation control functions, such as "play-back," "correction-mark," etc., in accordance with switch connections made at the remote dictator's instrument. As in the above-mentioned copending application, all of the relays are shown herein in their de-energized condition.

It should be noted that connections have been shown only to those relay contacts which appear to be necessary for a proper understanding of this invention, it being understood that the control unit relays including the three relays specifically referred to may include additional contacts (e. g. as shown schematically below the broken-lines 62) for performing functions not directly concerned with the present invention. A cable 61 is shown schematically as connected between the control unit 60 and the central dictating machine 26 for the purpose of carrying electrical signals representative of such additional functions.

The dictation system is made ready for use by energizing an A.-C. power circuit 70 (see the lower central portion of the drawing), which in turn activates the various power supplies, the filaments of the amplifier tubes (not shown), etc. With the system in such a "ready" condition, as will be evident from the description hereinbelow, the tone relay 64 and the limit relay 68 are energized, while the hold relay 66 is de-energized.

The general objectives of the present invention are achieved by circuit arrangements which de-energize the limit relay 68 when an appropriate stage in dictation operations has been reached. This limit relay, when so de-energized, causes a busy lamp 72 at the dictator's instrument 10 (and corresponding lamps at the other remote instruments not shown herein), to be energized. De-energization of this relay also is arranged, by means described in detail in the above-copending application (but not shown herein to simplify the disclosure), to cause a signal to be given to the attendant at the central dictating machine (e. g. by a buzzer, signal-lamp or other means), to effect de-energization of the clutch solenoid 50 to stop movement of the record 46, and to cause a tone signal to be fed to the dictator's handset.

The principal energizing circuit for the winding 74 of the limit relay 68 may be traced from the positive terminal 76 of a D.-C. power supply, generally indicated at 78 in the lower central part of the drawing (and analogous to power supply 140 in the above-mentioned copending application), through the relay winding 74, through an "approach switch" 80, through the contacts 82 of a "tube relay" generally indicated at 84 (shown de-energized), through either one of two lever switches 86 and 88, through a limit switch 90, and thence back to the negative terminal 92 of the power supply 78. This principal energizing circuit for the limit relay 68, and the various switching arrangements forming a part thereof, is essentially identical to that shown for the corresponding relay described in the above-mentioned copending application. The functioning of these switching arrangements is, briefly, as follows:

The approach switch 80 is opened by the movable carriage of the central dictating machine when this carriage has been driven to a point in the dictating operations where there is only approximately two and a half minutes of recording time left on the record 42. The tube relay 84 is energized by the current flowing in the plate circuit of the output tubes in the audio amplifier 40, so that whenever there is any failure in the tube filaments, this tube relay will be de-energized and break the energizing circuit for the limit relay 68.

The lever switches 86 and 88 are associated with the usual "record-reproduce" switch (not shown) which is used in the typical dictating machine to permit the machine to be conditioned either for recording or for reproducing (i. e. for "play-back" purposes). When the "record-reproduce" switch is placed in its neutral position (as when the record is being changed), both of the lever switches 86 and 88 will be opened, thereby de-energizing the limit relay 80. The limit switch 90 is opened by the dictating machine carriage when this carriage has reached the end of its travel, i. e. when there is no more recording time left on the record.

Turning now to the operation of the circuitry shown, when a dictator lifts up his handset to commence dictation, contacts 18 and 20 of the cradle switch 22 are closed to complete a direct-current path, including the series resistor 14 and the microphone 12, between the control unit input terminals 55 and 57. By means such as are shown in the above-mentioned copending application, completion of this circuit closes contacts 93 of a relay indcated at 94 (and analogous to relay 136 in that application), which thereby connects the negative terminal 92 of the power supply 78 to a lead 96. This, in turn, energizes the hold relay 66, the energizing circuit being completed from the lead 96 through the hold relay winding 98, and back to the positive terminal 76 of the power supply 78.

When the hold relay 66 is energized, power is supplied to the busy lamp 72 at the dictator's instrument to indicate that this system is in use. The energizing circuit for this lamp may be traced from the upper lamp terminal, along an interconnecting lead 100 to a terminal 101 in the control unit 60, through a movable arm 102 and a fixed contact 104 of the hold relay 66 to the positive terminal 106 of a second power supply generally indicated at 108 (analogous to power supply 366 in the mentioned application); and from the negative terminal 110 of this power supply 108 along a lead 112 to a control unit terminal 113, through another interconnecting lead 114 and thence to the lower terminal of the lamp 72.

With the arrangement shown herein, when the dictator dictates into the approach zone (i. e. when movement of the machine carriage causes the approach switch 80 to open), the principal energizing circuit for the limit relay 68 will be broken, but this relay will remain energized. This is because there is, at this stage of operations, a parallel bridging path which carries the relay current around the open approach switch 80. This parallel path may be traced from the lower terminal (referring to the drawing) of the limit relay winding 74, along a lead 116, through a fixed contact 118 and movable arm 120 of the (de-energized) tone relay 64, through a movable arm 122 and fixed contact 124 of the (energized) limit relay 68, and thence back to the right-hand side of the approach switch 80.

It may be noted that the tone relay 64 is de-energized (and thus its contacts 118 and 120 are closed) at this time because the hold relay 66 is energized. With the hold relay in an energized condition, its contacts 128 and 130 are open; this, in turn, breaks the energizing circuit between the power supply 76 and the tone relay winding 126, and thus the tone relay is de-energized and its contacts 118 and 120 are closed to complete the parallel path referred to above.

If the dictator now hangs up his handset while the machine carriage is in the approach zone, the hold relay 66 will be de-energized and the tone relay 64 will be energized. Energization of the tone relay opens its contacts 118 and 120, thereby breaking the parallel bridging path described immediately above. The limit relay 68 will, nevertheless, still remain energized, because a second parallel bridging path is connected around the approach switch 80 before the first parallel path, referred to above, is broken by energization of the tone relay 64.

This second parallel bridging path can be traced from the lead 116 through a movable arm 132 and fixed contact 134 of the hold relay 66 (now de-energized because the dictator has hung up his handset), through the movable arm 122 and fixed contact 124 of the limit relay 68, and thence back to the right-hand side of the approach switch 80. It should be noted that contacts 132 and 134 of the hold relay 66 will close before contacts 118 and 120 of the tone relay 64 open, since the tone relay energizing circuit serially includes contacts 128 and 130 of the hold relay and thus the tone relay is energized after the hold relay is de-energized.

If, while the dictating machine carriage is still in the approach zone, the dictator picks up his handset again, or another dictator picks up a handset after the first dictator has hung up, the limit relay 68 will immediately become de-energized. This is because the second parallel bridging path around the approach switch 80 will be broken by the opening of contacts 132 and 134 of the hold relay 66. Although contacts 118 and 120 of the tone relay 102 will close again when the dictator picks up his handset in the approach zone, the closure of these latter contacts will not take place until after the opening of contacts 132 and 134 of the hold relay, and thus there will, momentarily, be no parallel bridging path around the approach switch in this situation. To insure that this sequence of operation occurs, the tone relay is provided with a "slow drop-out" characteristic by means of a relatively large capacitor 136 connected in parallel with the tone relay winding 126. Other arrangements, of course, may be employed for providing such a characteristic.

Consequently, when the contacts 132 and 134 of the hold relay 66 are opened, the energizing circuit to the limit relay 68 is broken, and the limit relay is immediately de-energized. De-energization of the limit relay causes its locking contacts 122 and 124 to open, which prevents the re-establishment of the first-mentioned parallel bridging path when the contacts 118 and 120 of the tone relay 64 are subsequently closed upon de-actuation of the tone relay.

De-energization of the limit relay 68 completes a circuit, through a movable arm 138 and fixed contact 140 of this relay, to energize the lamp 72 at the dictator's instrument 10. In addition, in a manner explained more fully in the above-mentioned copending application, de-energization of this limit relay is arranged to provide a signal to the attendant at the dictating machine, to de-activate the machine clutch 50, and to feed to warning signal to the receiver (not shown) in the remote dictator's instrument 10.

In a complete dictation system, both the hold relay 66 and the tone relay 64 will normally be provided with additional contacts (indicated generally below the broken-line block 62, but not shown connected in order to simplify the drawing), for performing certain other desired remote dictation functions. Such additional functions, and circuit arrangements for carrying them out, are described in detail in the above-mentioned copending application.

For example, the tone relay may be arranged, when de-energized after a dictator has picked up his handset, to activate a tone oscillator which feeds a short duration tone signal to the handset receiver to inform the dictator that he has taken control of the dictation system. Similarly, the hold relay may be arranged, when energized after a dictator has picked up his handset, to complete the power circuit to the drive motor in the dictating machine, to apply plate voltage to the electronic tubes forming a part of the speech amplifier, and to condition the clutch solenoid power circuit for operation from the remote station. Thus, energization of the hold relay may, in one sense, be said to place the dictation system in "stand-by" condition, available for dictating operations.

The typical remote dictation system includes, at the dictator's instrument, a "start-stop" button which, when pressed, energizes a control circuit to start the record moving, e. g. by energizing the drive clutch mechanism. In the arrangement shown herein, pressing the "start-stop" button (not shown) closes a switch 142, connected in parallel with the resistor 14. The consequent shorting of the resistor 14 causes an increased amount of direct-current to flow through the interconnecting lines 54 and 56 and in the control unit 60. Detailed circuit arrangements for utilizing such an increase in current flow for actuating the dictating machine clutch are shown in the above-mentioned copending application.

We claim:

1. For use with a remote dictation system having a centrally-located dictating machine including a record mounted on a movable support, drive means for imparting rotary motion to said support, a sound transducing unit engageable with said record during movement thereof, and means for providing relative motion between said transducing unit and said support to cause said transducing unit to move over the area of said record on which sound is to be recorded, control apparatus comprising, in combination, at least one remote dictator's instrument including a microphone unit and an operating switch having first and second positions, said operating switch being arranged to condition said dictation system for operation when in said first position, interconnecting means for transmitting audio signals from said microphone unit to said dictating machine when said operating switch is placed in its first position, an approach switch associated with said dictating machine and arranged to be actuated when said transducing unit has been driven to a point spaced from the end of said record, signal control means energizable by a power circuit serially including said approach switch, circuit means arranged to form at least one parallel bridging path around said approach switch, said path being completed to maintain the energization of said signal control means when said approach switch has been actuated during dictating operations and subsequently said operating switch has been moved from said first position to said second position to deactivate said dictation system, and means controlled by said operating switch to break said parallel bridging path and de-energize said signal control means when said approach switch is in its actuated condition and, concurrently, said operating switch is moved from said second position to said first position to activate said dictation system, said signal control means being arranged when de-energized to activate a signalling device associated with said central dictating machine to indicate that said record has been substantially filled with recorded material and must be replaced with a fresh record before dictating operations may be recommended.

2. For use with a remote dictation system having a centrally-located dictating machine including a record mounted on a movable support, drive means for imparting rotary motion to said support, a sound transducing unit engageable with said record during movement thereof, and means including said drive means for providing relative motion between said transducing unit and said support to cause said transducing unit to move over the area of said record on which sound is to be recorded, control apparatus comprising, in combination, at least one remote dictator's instrument including a microphone unit and an operating switch having first and second positions, said operating switch being arranged to condition said dictation system for operation when in said first position, interconnecting means arranged when said operating switch has been placed in its first position to transmit sound signals from said microphone unit to said dictating machine for recording on said record, an approach switch associated with said dictating machine and arranged to be actuated in accordance with the relative movement between said transducing unit and said support when said transducing unit is at a predetermined point with respect to said support spaced substantially from the end of said record, signal control means including at least one relay, and circuit means under the joint control of said approach switch and said operating switch, said circuit means comprising a power circuit for energizing said signal control means relay, said circuit means being arranged in such a manner that said signal control means relay is not operated when said approach switch is actuated and said operating switch is moved from said first position to said second position to deactivate said dictation system, said circuit means further being arranged to operate said signal control means relay whenever said approach switch is in its actuated condition and, concurrently, said operating switch is moved from said second position to said first position to activate said dictation system, said signal control means relay being arranged when so operated to energize a signal to indicate that said record has been nearly filled with dictation and is to be replaced with a fresh record before dictating operations may be recommended.

3. For use with a remote dictation system having a centrally-located dictating machine including a record mounted on a movable support, drive means for imparting rotary motion to said support, a sound transducing unit engageable with said record during movement thereof, and means for providing relative motion between said transducing unit and said support to cause said transducing unit to move over the area of said record on which sound is to be recorded, control apparatus comprising, in combination, at least one remote dictator's instrument including a microphone unit and an operating switch having first and second positions, said operating switch being arranged to condition said dictation system for operation when in said first position, interconnectnig means for transmitting sound signals from said microphone unit to said dictating machine when said operating switch is placed in its first position, an approach switch associated with said dictating machine and arranged to be actuated when said transducing unit has been driven to a point spaced substantially from the end of said record, signal control means arranged for energization by a power circuit serially including said approach switch, circuit means arranged to form first and second parallel bridging paths around said approach switch, means controlled by said operating switch to break said first parallel path when said operating switch is moved from said first position to said second position to deactivate said dictation system, and means controlled by said operating switch and said approach switch to break said second parallel path and also to prevent re-establishment of said first parallel path when said approach switch is in its actuated condition and, concurrently, said operating switch is moved from said second position to said first position to activate said dictation system, said signal control means being arranged when de-energized to activate a signalling device associated with said central machine to indicate that said record is ready to be replaced with a fresh record.

4. For use with a remote dictation system having a centrally-located dictating machine including a record mounted on a movable support, drive means for imparting rotary motion to said support, a sound transducing unit engageable with said record during movement thereof, and means for providing relative motion between said transducing unit and said support to cause said transducing unit to move over the area of said record on which sound is to be recorded, control apparatus comprising, in combination, at least one remote dictator's instrument including a microphone unit and an operating switch having first and second positions, said operating switch being arranged to condition said dictation system for operation when in said first position, interconnectnig means for transmitting sound signals from said microphone unit to said dictating machine when said operating switch is placed in its first position, an approach switch associated with said dictating machine and arranged to be actuated when said transducing unit has been driven to a point spaced substantially from the end of said record, a signal control relay arranged to be energized by a power circuit serially including said approach switch, circuit means arranged to form first and second parallel bridging paths around said approach switch, a first relay controlled by said operating switch and having a pair of contacts arranged in series with said first parallel path to open said first parallel path when said first relay is caused to be de-energized by moving said operating switch from said first position to said second position, a second relay under the control of said first relay and having a pair of contacts in series with said second parallel path to open said second parallel path when said approach switch is in its actuated condition and, concurrently, said operating switch is moved from said second position to said first position whereby said signal control relay is de-energized, said signal control relay having a pair of locking contacts in series with both of said first and second parallel paths to prevent re-establishment of said paths while said signal control relay is de-energized, said signal control relay further being arranged when de-energized to activate signalling means associated with said central machine to indicate that said record is ready to be replaced with a fresh record.

References Cited in the file of this patent

UNITED STATES PATENTS 2,650,951 Kobler ---------------- Sept. 1, 1953

UNITED STATES PATENT OFFICE

CERTIFICATE OF CORRECTION

Patent No. 2,791,639 May 7, 1957

Frederick W. Roberts et al.

It is hereby certified that error appears in the printed specification of the above numbered patent requiring correction and that the said Letters Patent should read as corrected below.

Column 6, line 10, for "recommended" read --recommenced--; line 52, for "recommended" read --recommenced--.

Signed and sealed this 3rd day of September 1957.

(SEAL)

Attest:

KARL H. AXLINE

Attesting Officer

ROBERT C. WATSON
Commissioner of Patents